Jan. 6, 1959  C. GONDOLFO  2,867,698
AUTOMOBILE FUEL TANK ALARM
Filed Nov. 25, 1955  2 Sheets-Sheet 1

INVENTOR.
CHARLES GONDOLFO
BY
Carl Miller
ATTORNEY

Jan. 6, 1959          C. GONDOLFO          2,867,698
AUTOMOBILE FUEL TANK ALARM

Filed Nov. 25, 1955          2 Sheets-Sheet 2

INVENTOR.
CHARLES GONDOLFO
BY
Carl Miller
ATTORNEY

United States Patent Office 2,867,698
Patented Jan. 6, 1959

2,867,698
AUTOMOBILE FUEL TANK ALARM

Charles Gondolfo, Bronx, N. Y.

Application November 25, 1955, Serial No. 548,863

1 Claim. (Cl. 200—56)

This invention relates to warning signals and alarms in connection with liquid gauges and the like for fuel tanks, and particularly to an automobile fuel tank alarm.

The main object of my invention is to provide an alarm or signal for indicating when the fuel supply is running dangerously low in the fuel tank of an automobile, so as to require early refilling of the tank.

Another object of this invention is to have an alarm for the stated purpose which includes an electrical system having make and break contacts and an electric signal device responsive thereto.

A further object of the invention is to have such an alarm organized into an electric system which is relatively simple as a whole and not likely to get out of order.

Yet another object is to have such a fuel tank alarm system which may be partly or fully concealed and controlled by a manual switch and/or a timer.

It is likewise a practical object herein to have a fuel tank alarm of the character indicated which is easy to make, simple to install and simple to use, so as to be reasonable in cost in order to encourage wide distribution on the market.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which.

In these views, the same reference numerals indicate the same parts and features throughout.

It is probable that everyone who drives an automobile knows all too well how annoying it can be to run suddenly out of gasoline and be stalled, especially if this occurs out in the country where the nearest gasoline station is at a distance. Such a condition may actually be serious, and is therefore to be prevented, as far as possible. Upon considering this problem, it has occurred to me that an electric alarm should be so arranged with respect to make and break contacts and a current source with a circuit, that upon the fuel reaching a predetermined low level, the circuit is automatically closed to sound the alarm, and thus notify the driver that the fuel supply is becoming low. As a result, I have succeeded in producing a fuel tank alarm along the lines already mentioned, which I shall now proceed to describe in detail in the following, due reference being had to the drawings.

Figure 1:
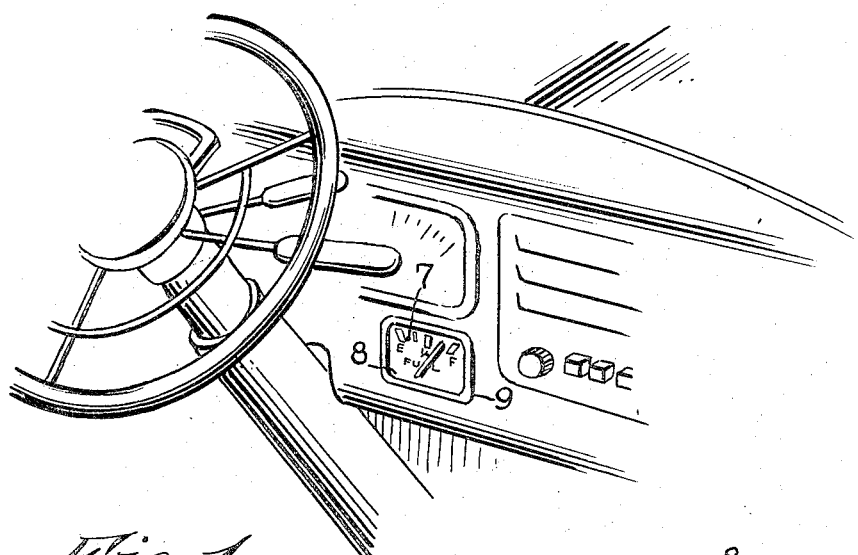
Figure 1 is a perspective view of a portion of an automobile dashboard with the invention installed in connection with the fuel gauge thereof, the major portion of the parts of the invention being concealed but shown elsewhere.
Figure 3:
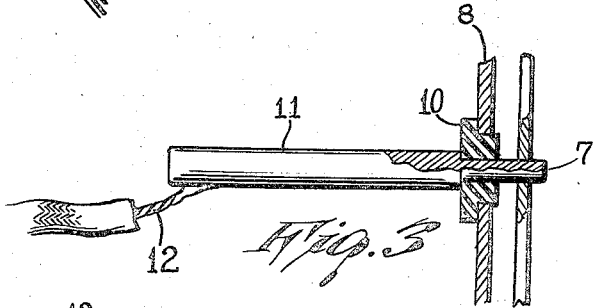
Figure 3 is a vertical section taken on line 3—3 in Figure 2.
Figure 2:
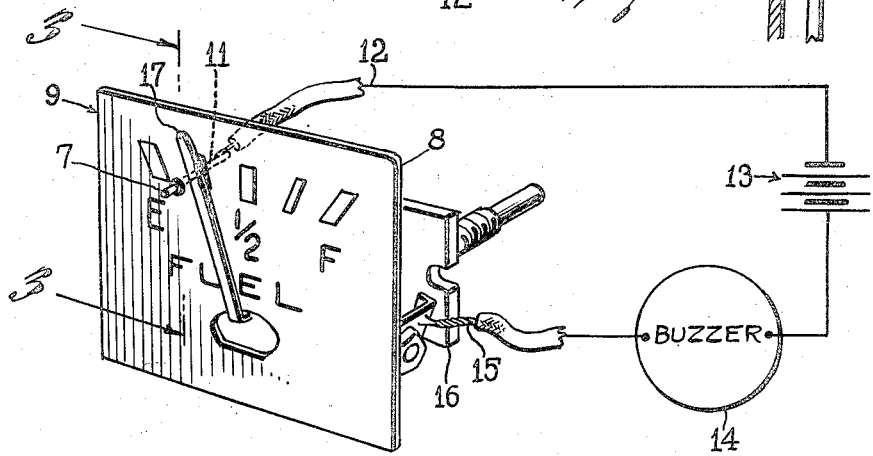
Figure 2 is a perspective of the invention as such with a circuit diagram included therewith.

Hence, in the practice of my invention, as shown in Figures 1, 2 and 3, a metal contact 7 is installed through the dial 8 of a gasoline gauge 9 adjacent to the low or empty dial point E, being insulated from the dial by the di-electric bushing 10 and forming the front tip of a metal rod 11 connected by a conductor 12 soldered thereto and connected to a current source such as a battery 13. From the latter, another conductor extends to a buzzer 14 which in turn is connected by a further conductor 15 to the frame or casing 16 of the gauge 9, so that when the dial hand 17 is brought down to the vicinity of low gauge point E, it will make effective electrical contact with metal contact 7 and close the circuit of buzzer 14 and sounding the latter. The sounding of this buzzer will then be silenced by the hand 17 shifting away from contact 7 as soon as gasoline is filled into the tank (not shown). It is, of course desirable to avoid using the last portion of the fuel in the tank in any event, as it may occasion irregular operation of the engine, aside from soon stalling the car from complete lack of fuel.

Figure 4:
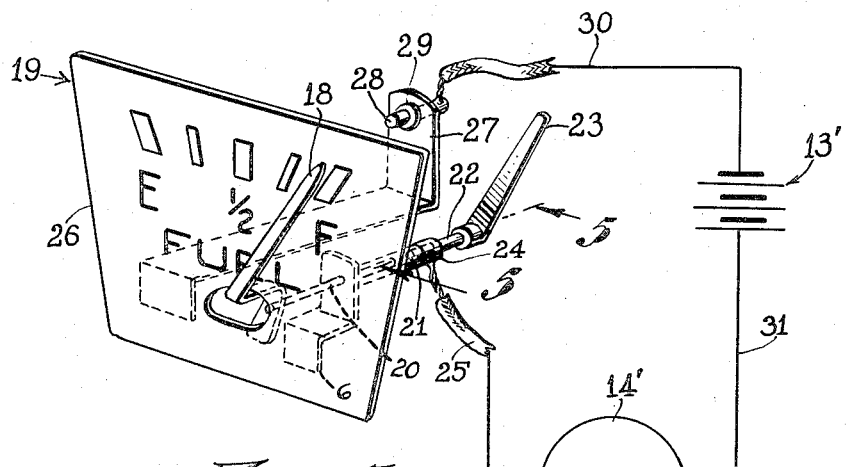
Figure 4 is a similar view to that of Figure 2, but showing a modification.
Figure 5:
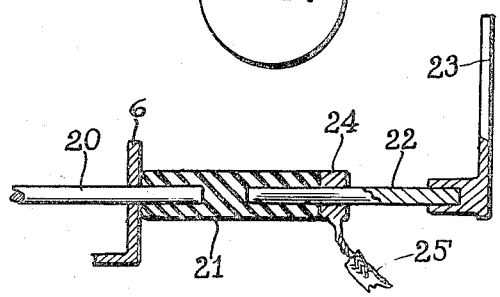
Figure 5 is a section taken on line 5—5 in Figure 4.

Instead of installing the active contact on the dial of the fuel gauge, the pointer 18 of the gauge 18 shown in Figures 4 and 5 is provided with a shaft 20 supported in stationary bearing 6 and fitting into insulating bar 21 from which extends rearwardly a metal rod 22. Upon this rod is mounted a metal contact arm 23, while at the rear of insulating bar 21 is mounted a metal bushing or collar 24 upon rod 22 independently of arm 23 but having a conductor 25 connected thereto which leads to the buzzer 14'.

Upon the rear of the gauge dial 26 is fixed a rear bracket 27 having the contact 28 mounted thereon and extending through the insulating bushing 29 into the path of contact arm 23. The contact is disposed in effective position for arm 23 to make contact therewith when pointer 18 approaches zero point E on dial 26. As the contact 28 is connected by conductor 30 to current source 13' and the latter connects with buzzer 14' by conductor 31, contact between arm 23 and contact member 28 will sound buzzer 14'.

Figure 6:
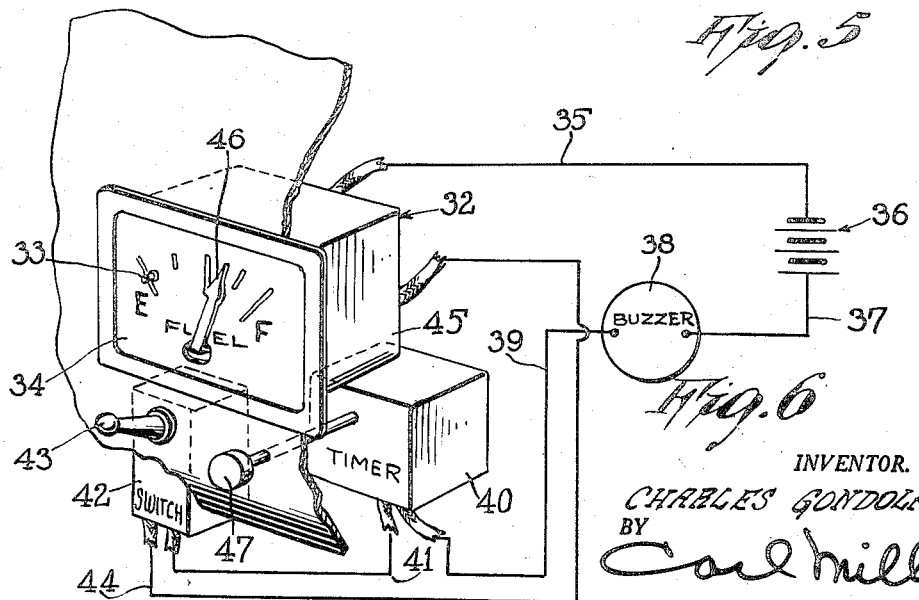
Figure 6 is an another perspective view showing a further modification including a timer and switch in the circuit thereof.

In Figure 6, fuel gauge 32 has a contact 33 upon its dial 34 connected by conductor 35 with current source 36 which in turn is connected by conductor 37 to buzzer 38. This buzzer is connected by a conductor 39 with a timer 40 having another conductor 41 connecting it to manual switch 42 provided with switch lever 43 by which to open or close the switch at will. The switch has another conductor 44 which connects with the casing 45 of the gauge so that its pointer 46 will close the circuit by contact with stationary contact 33. The arrangement is such that when the fuel supply drops the pointer toward zero point E on dial 34, it makes contact with said contact 33, closing the circuit of current source 36 through buzzer 38 and causing it to sound. As soon as it has started to sound, the driver is of course at once aware of the condition of the fuel tank and needs no further sound, so that he can then snap switch lever 43 to off position, breaking the circuit and silencing the buzzer. If the driver will not or can not snap the switch, the timer 40 which is connected into the circuit and provided with the adjusting knob 47 by which to adjust the length of time which must pass before the timer automatically opens the buzzer circuit, may then be allowed to take effect, so that when the buzzer starts to sound, the timer begins to measure the sounding time for the period set by knob 47, and then shuts off the buzzer.

The driver may thus either shut off the buzzer as quickly as desired, or having set the timer by knob 47 for a desired sounding time period, he merely awaits the cessation of the sounding of the buzzer as effected by opening of the circuit by the timer.

From the foregoing, it is evident that a car driver may have at hand an alarm operated in conjunction with the fuel gauge which notifies him of the drop in fuel supply when the fuel tank approaches a low point dangerously near to empty. It is likewise evident that the driver may also have means at hand for shutting off the alarm at once or after a predetermined time interval, if so desired.

In any event, the driver by the use of this invention will have means at hand for warning him automatically when he should refill the fuel tank of the automobile so that he will not be in danger of stalling in some out of the way place which may be serious or at least annoying and occasion delay in reaching his destination.

Manifestly, variations may be resorted to, and parts and features may be modified or used without others within the claim.

Having now fully described my invention, I claim:

A fuel gauge for a fuel alarm system, including a fuel dial having a range of indicia thereon to indicate full tank at one end and empty tank at the other end and having an aperture through which a dial pointer may extend, a bearing support upon the rear of the dial, a pointer shaft extending through the bearing support and having a dial pointer mounted upon the forward end and extending through the dial aperture with one end of the pointer adjacent to the indicia of the dial, an insulated shaft portion secured to the rear portion of said pointer shaft rearwardly of said dial and in turn having a rearwardly extending conductive shaft portion upon the rear of said insulated shaft portion, a conductor mounted upon the conductive shaft portion and making effective continuous electrical contact therewith, a stationary contact distinct from said conductor disposed rearwardly of said dial, and a rear metal contact arm fixed upon the rear end of said conductive shaft portion in substantial parallelism with the dial pointer in effective position to make active contact with said stationary contact when said dial pointer approaches the portion of said dial bearing the empty tank indicia, a circuit connection to the stationary contact and a second circuit connection to said conductor of said shaft portion.

References Cited in the file of this patent
UNITED STATES PATENTS

| | | |
|---|---|---|
| 513,829 | Schureman | Jan. 30, 1894 |
| 807,568 | Mitchell | Dec. 19, 1905 |
| 1,607,512 | Churcher et al. | Nov. 16, 1926 |
| 1,729,800 | Scott | Oct. 1, 1929 |
| 2,014,286 | Nelson | Sept. 10, 1935 |
| 2,523,352 | Behr | Sept. 26, 1950 |
| 2,615,082 | Mamola | Oct. 21, 1952 |
| 2,620,412 | Ford | Dec. 2, 1952 |